(12) United States Patent
Sobel

(10) Patent No.: US 8,904,136 B2
(45) Date of Patent: Dec. 2, 2014

(54) OPTIMIZED SHRINKING OF VIRTUAL DISKS

(75) Inventor: William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 424 days.

(21) Appl. No.: 13/048,413

(22) Filed: Mar. 15, 2011

(65) Prior Publication Data

US 2012/0239896 A1    Sep. 20, 2012

(51) Int. Cl.
*G06F 12/00* (2006.01)
*G06F 3/06* (2006.01)

(52) U.S. Cl.
CPC ............ *G06F 3/0664* (2013.01); *G06F 3/0608* (2013.01); *G06F 3/0644* (2013.01); *G06F 3/061* (2013.01)
USPC .......................................................... 711/165

(58) Field of Classification Search
CPC ..... G06F 3/0608; G06F 3/061; G06F 3/0644; G06F 3/0664
See application file for complete search history.

(56) References Cited

U.S. PATENT DOCUMENTS

| | | | |
|---|---|---|---|
| 8,171,201 B1 * | 5/2012 | Edwards, Sr. | 711/6 |
| 2003/0188035 A1 * | 10/2003 | Lubbers et al. | 709/310 |
| 2005/0091266 A1 * | 4/2005 | Hasegawa | 707/103 R |
| 2009/0144499 A1 * | 6/2009 | Nicholson et al. | 711/118 |
| 2012/0167080 A1 * | 6/2012 | Vilayannur et al. | 718/1 |

* cited by examiner

*Primary Examiner* — Matthew Bradley
*Assistant Examiner* — Ramon A Mercado
(74) *Attorney, Agent, or Firm* — Campbell Stephenson LLP

(57) ABSTRACT

Various systems and methods shrinking a storage object. For example, one method can involve receiving a request to shrink the storage object. The storage object can comprise multiple storage locations. The method can also involve receiving a list that identifies a set of the storage locations. The list can be generated in response to the request to shrink the storage object. The method can also involve reading data from a set of storage locations in the storage object that are not identified in the received list and copying the read data from the first storage object to a second storage object.

22 Claims, 7 Drawing Sheets

OPTIMIZED SHRINKING OF VIRTUAL DISKS

FIELD OF THE INVENTION

This invention relates to data storage and, more particularly, to resizing virtual disks.

DESCRIPTION OF THE RELATED ART

A virtual disk is a storage object formed directly or indirectly from memory of one or more underlying physical storage devices. A virtual disk is interpreted by a virtual machine as a physical storage device, e.g., hard disk. One type of virtual disk is a dynamic virtual disk. A dynamic virtual disk can grow in size from a relatively small initial size, where the dynamic virtual disk uses a relatively small amount of storage space, towards some maximum size, where the dynamic virtual disk uses a larger amount of storage space. As the virtual machine stores additional data, the virtual disk grows in size. Dynamic virtual disks provide space-efficient use of underlying physical storage devices since a dynamic virtual disk only consumes storage space when the virtual machine actually needs the storage space.

When the virtual machine is no longer using a portion of the storage space, the unused storage space can be reclaimed. For example, if the virtual machine stored a file on the virtual disk, but subsequently designated the file as deleted, the storage space that contains the file in the underlying physical storage device is no longer actively used by the virtual machine. This storage space can be reclaimed, for example, by a file system that manages the underlying physical storage device. This is known as "shrinking" the virtual disk. However, conventional methods of shrinking virtual disks typically require significant amounts of input and output (I/O) operations, which can negatively impact performance.

SUMMARY OF THE INVENTION

Various systems and methods shrinking a storage object are disclosed. For example, one method can involve receiving a request to shrink the storage object. The storage object can comprise multiple storage locations. The method can also involve receiving a list that identifies a set of the storage locations. The list can be generated in response to the request to shrink the storage object. The method can also involve reading data from a set of storage locations in the storage object that are not identified in the received list and copying the read data from the first storage object to a second storage object. In an embodiment, the first and second storage objects are dynamic virtual disks.

In an embodiment, the method involves creating a file in response to the request to shrink the storage object. Creating the file can be accomplished without performing any I/O operations. This fact can be detected by checking the value of an attribute associated with the file. The list identifies portions of the storage object that are included in the file. Once the shrink operation is complete, the file can be deleted. In an embodiment, the portions identified in the list are portions of the storage object that, prior to the creation of the file, were unused.

In an embodiment, the method involves receiving a second list and merging the second list with the first list. Each list corresponds to a partition of the storage object and identifies unused portions of the respective partitions.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
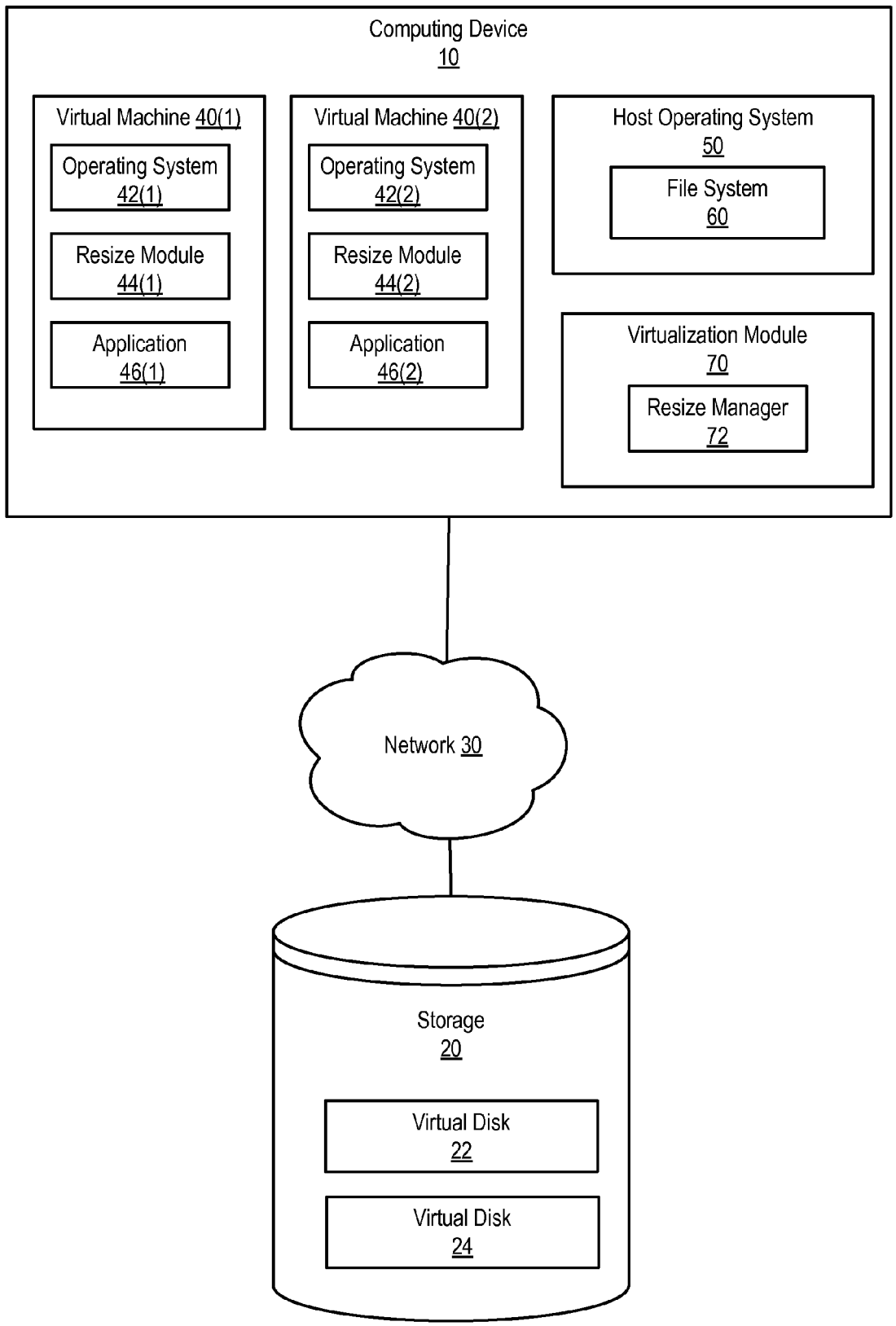
FIG. 1 is a block diagram of a system that shrinks dynamic virtual disks, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

In a system employing virtualization, one or more virtual machines are deployed on a host device. The host device has a host operating system installed that provides access to and manages resources of the host device, such as processor cycles, storage space, and network bandwidth. The host allocates these resources for use among the virtual machine(s). Each virtual machine, or guest, can run its own operating system and applications.

A virtual machine running an operating system and one or more applications typically uses some storage space. The host typically assigns one or more virtual disks to a virtual machine. One type of virtual disk is a dynamic virtual disk. When a dynamic virtual disk is created, for example by a host operating system, the host sets a maximum size for the virtual disk, e.g., 100 gigabytes (Gb). The virtual disk is known as a 100 Gb virtual disk, and once the virtual disk is associated with a virtual machine, the virtual machine sees the virtual disk as a 100 Gb storage device.

When the host first creates a dynamic virtual disk, the virtual disk consumes essentially zero physical storage space since the virtual machine has not yet written any data to the virtual disk. That is, the host has allocated 100 Gb of storage space to the virtual disk, but the virtual disk has not yet used any of the storage space. The host's allocation of a 100 Gb is a promise that 100 Gb of physical storage space are available for the virtual machine that is associated with the virtual disk. Dynamically allocating the virtual disk means that the host's file system need not actually assign specific physical storage of the underlying physical storage device to the virtual disk until such time as a virtual machine directs a write towards the virtual disk. The storage space that may ultimately be utilized by the virtual disk is, until such time as the virtual machine writes to the storage space, available for other purposes, e.g., temporary storage.

Another type of virtual disk a host can create is a fixed disk. In the case of a fixed disk, the host's file system reserves physical storage corresponding to the allocated space when the fixed disk is created. In this example, if the host allocates 100 Gb to a fixed virtual disk, the file system blocks off 100 Gb of physical storage space on the underlying physical storage device and marks the storage space as used, so that the storage space cannot be used for any other purpose.

In the case of a dynamic virtual disk, the virtual machine sees the virtual disk as a 100 Gb storage device having 100 Gb (or nearly 100 Gb) of free, or available, space and the file system sees the virtual disk as a storage object having a size of essentially zero. The used space in a virtual disk upon creation of the virtual disk is not actually zero, because certain metadata associated with the virtual disk is typically stored in the virtual disk. For example, the virtual disk can include a map that identifies available space and used space in the virtual disk. Thus, even though the host allocates a 100 Gb virtual disk, the virtual machine may see the virtual disk as initially having less than 100 Gb available space, and the file system may see the virtual disk as having a size of greater than zero.

When the virtual machine writes to the virtual disk, physical storage space is consumed, or used. Typically, the virtual machine marks a portion of the virtual disk as used, which reduces the amount of available space the virtual machine sees in the virtual disk. The virtual machine may be able to directly access the underlying physical storage device to write the data. Alternatively, the virtual machine may transfer the data to the file system on the host, and the file system may perform the actual write to the physical storage device. The virtual machine also notifies the file system of a write. In response to the virtual machine's notification, the file system marks as used a portion of the underlying physical storage device that stores the virtual disk. For example, if the virtual machine writes a 1 Gb file, the file system will increase the size of the virtual disk by 1 Gb and mark a an amount of physical storage space equal to 1 Gb in size as used, and thus unavailable for other purposes. In this way, the size of the virtual disk can grow over time.

In some cases, the virtual machine no longer wishes to store data previously written to the virtual disk. Consider the following example. At a first point in time, the virtual machine downloads a software package and writes the software package to the virtual disk. In this example, the software package uses 1 Gb of space. That is, when the virtual machine writes the software package to the virtual disk, the virtual machine reduces the amount of free space in the virtual disk by 1 Gb and the file system increases the size of the virtual disk file by 1 Gb. If the virtual machine subsequently downloads a newer version of the software package that also uses 1 Gb of storage space and stores the newer version in the virtual disk, the virtual machine again reduces the amount of free space in the virtual disk by 1 Gb and the file system again increases the size of the virtual disk file by 1 Gb. When increasing the size of the virtual disk file, the file system marks as used a corresponding amount of physical storage space on the underlying physical storage device. In this example, the virtual disk now stores two versions of the software package, a newer version, and an older version. Presuming that the older version is obsolete, the virtual machine can designate the older version as deleted. When the virtual machine designates the older version as deleted, the virtual machine increases the amount of available space in the virtual disk by 1 Gb. However, the virtual machine typically does not notify the file system of this, so the file system still has physical storage space allocated for both versions of the software package. That is, while the virtual machine sees only 1 Gb of the virtual disk as used to store the newer software package, the file system still sees 2 Gb used to store both versions of the software package.

Since the host is not notified when the virtual machine performs operations that create free space (e.g., designating data as deleted, as in the example above) the file system does not reduce the size of the virtual disk in response to such operations. If this situation is allowed to progress to its logical conclusion, the virtual disk file may eventually grow to its maximum allocated size, and the virtual machine may be unable to store any additional data in the virtual disk. In some cases this can happen even though the virtual machine no longer cares about a significant portion of the data in the virtual disk. For example, the virtual machine may have specified that certain data should be designated as deleted. As a result, these data portions are seen by the virtual machine as available space. However, the virtual machine typically does not communicate to the file system which portions of data the virtual machine no longer cares about. Therefore, the file system has marked as used, or unavailable, physical storage on the underlying physical storage device that contain data that the virtual machine no longer cares about. In this case, the virtual disk has space available, from the virtual machine's perspective, but the virtual disk may be seen as full from the host's perspective.

This is undesirable for a number of reasons. In one example, if the virtual disk file reaches its maximum allocated size, as seen by the file system, the virtual machine will be unable to perform new data write operations. Furthermore, storage space is generally at a premium, so storing data that is no longer useful in a storage device can increase the cost of a storage system and require acquisition of additional storage devices needlessly. Still further, increasing the amount of storage space utilized in a storage device can, in some cases, negatively impact performance of the storage device. For example, it may take longer to read or write to a storage device when the storage device is more fully loaded with data than when the storage device is less fully loaded.

In order to ameliorate the above harms, conventional systems can employ methods of reclaiming storage space the virtual machine no longer needs. This is known as shrinking a virtual disk. One such method, and limitations associated with such conventional methods, is discussed below.

One method of shrinking a virtual disk involves writing a pattern (e.g., all zeros) to all areas of the underlying storage device that are allocated for the virtual disk but that contain data that is unused by the virtual machine. Zeros are written to those areas of the physical storage device that store data that the virtual machine previously wrote, but that the virtual machine is no longer using. In this example, the virtual machine's operating system is compatible with the file system used to organize data on the underlying physical storage device. This allows the virtual machine to specify which physical storage space in the underlying physical storage device should be overwritten with zeros.

When the virtual machine receives a request to shrink the virtual disk, the virtual machine first identifies the portions of the virtual disk that the virtual machine previously used but is no longer using. The virtual machine then writes all zeros to those portions of the virtual disk. In one example, the virtual machine maintains a map of the virtual disk that indicates which portions of the virtual disk contain used, or valid, data and which portions do not. This map indicates to the virtual machine how much space in the virtual disk is used and how much space in the virtual disk is available.

The host then shuts down or suspends operations of the virtual machine. This means that the virtual machine is no longer able to write to the virtual disk. In some cases, the virtual machine may be able to still read from the virtual disk. In the context of a shrink operation, the virtual disk is known as the source virtual disk, since the data in the virtual disk is going to be copied to a new virtual disk, called the destination virtual disk.

The host then creates the new (destination) virtual disk. The file system can allocate the same amount of storage space to the destination virtual disk. For example, if the host previously allocated 100 Gb for the source virtual disk, the host can allocate another 100 Gb for the destination virtual disk. As noted above, the host sees the destination virtual disk as a storage object having, at the time the destination virtual disk is created, essentially zero size.

The host then reads the portions of the underlying physical storage device that correspond to the source virtual disk. The host reads all the storage space that the file system marked as being used by the virtual disk. That is, if the file system sees the size of the virtual disk file as being 100 Gb, which means that the file system has marked 100 Gb of storage space as used by the virtual disk, the host reads the 100 Gb of data.

For each portion of the underlying physical storage device that the host reads, the host determines whether the portion is filled with all zeros. If so, the host considers that portion of the physical storage device as unused by the virtual machine. When the portion of the physical storage device does not contain all zeros, the host considers the portion as used by the virtual machine and writes the data stored in the portion to the new virtual disk. Thus, any portions of the physical storage device that are allocated to the virtual disk and that contain all zeros are not copied from the source virtual disk to the destination virtual disk. As noted, the portions that contain all zeros are those portions that the virtual machine indicated were not being used by the virtual machine and so the virtual machine wrote all zeros to those portions.

Once all the data used by the virtual machine has been read and copied to the destination virtual disk, the destination virtual disk contains only data marked as being used by the virtual machine, and does not contain data that the virtual machine does not care about. At this point, the host can delete the source virtual disk file and direct the virtual machine to resume operations using the destination virtual disk. The virtual machine can begin writing data to the destination virtual disk and reading from the destination virtual disk.

The method described above can result in the size of the virtual disk being significantly reduced, from the perspective of the host. However, doing so requires writing zeros to all portions of the physical storage device that contain data that is no longer used by the virtual machine and reading all portions of the physical storage device that the virtual disk has used. In some cases the reads and writes (I/O operations) can consume significant computing resources, such as processor cycles and data transmission bandwidth.

Consider the example where a virtual disk is seen as being 100 Gb, but only includes 32 Gb of data that the virtual machine cares about. Performing the method above would involve the virtual machine writing 68 Gb of zeros. The host would then read 100 Gb of data and compare the 100 Gb to zeros. The host would then write the 32 Gb of data the virtual machine cares about to the new virtual disk. This adds up to 200 Gb of I/O operations.

An alternative method of shrinking a dynamic virtual disk is described below with respect to the attached figures. The alternative method reduces the amount of I/O operations to perform the same shrink to close the theoretical minimum. In the example above, the alternative method involves reading only 32 Gb and writing only 32 Gb. This elimination of 136 Gb of I/O operations represents a savings of 68%, which means the same shrink operation can be performed in a shorter length of time and uses significantly fewer computing resources, such as processor cycles and data transmission bandwidth.

FIG. 1 is a block diagram of a computing system. As shown the computing system includes a computing device 10 and a storage device 20, which includes virtual disk 22 and virtual disk 24, coupled by a network 30. Network 30 can include a WAN (Wide Area Network), such as the Internet, one or more LANs (Local Area Networks), and/or one or more SANs (Storage Area Networks).

Computing device 10 is a computing device such as a personal computer, laptop computer, server, personal digital assistant, cell phone, or the like. Computing device 10 includes operating system 50, which includes file system 60, and virtualization module 70, which includes resize manager 72. Computing device 10 also implements virtual machine 40(1), which includes operating system 42(1), resize module 44(1), and application 46(1), and virtual machine 40(2), which includes operating system 42(2), resize module 44(2), and application 46(2).

Operating system 50 can provide access to computing resources available through computing device 10, such as processor or storage resources, e.g., storage 20. In an embodiment, storage 20 includes a physical storage device that is organized into physical clusters. A cluster represents the smallest amount of data that can be read or written to storage 20, e.g., 4 Kb. Each cluster in the physical storage device is sequentially numbered from, for example, physical cluster zero representing the first physical cluster, to some maximum number that represents the last physical cluster in the physical storage device. Storage device 20 can be included within and/or coupled to (e.g., via a bus, network, or other appropriate interconnect) computing device 10. Storage device 20 provides persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape).

File system 60 can organize data, such as data in storage 20, into files and directories. File system 60 can maintain a listing of the physical locations of files and data in storage 20. For example, when operating system 50 creates a new file, operating system 50 can inform file system 60 of parameters of the file, such as size and type, associations, and various other metadata. With this information, file system 60 can determine which physical clusters, e.g., in storage 20, will store data for the file. Similarly, when a write is directed to storage 20, file system 60 assigns specific physical clusters to store the data that is written. File system 60 keeps track of which physical clusters are used, and which files store data in the used physical clusters, and which physical clusters are unused.

In an embodiment, operating system 50 creates a virtual disk, such as virtual disk 22. File system 60 specifies which physical clusters in storage 20 store data for virtual disk 22. In an embodiment, operating system 50 specifies that virtual disk 22 is a dynamic virtual disk. A dynamic virtual disk initially has a relatively small amount of storage actually used and can grow as more space is needed by a virtual machine that has write access to the virtual disk. File system 60 sees the dynamic virtual disk 22 as a storage object, e.g., a file, which initially has size of nearly zero. Thus, when virtual disk 22 is initially created, file system 60 does not identify any of the physical clusters in storage 20 as actually storing data for virtual disk 22. As more data is written to virtual disk 22, e.g., by virtual machine 40, file system 60 increases the size of virtual disk 22 and identifies additional physical clusters in storage 20 as storing data for virtual disk 22.

Operating system 50 can assign virtual disk 22 to one or more of virtual machines 40. Operating system 50 can notify virtual machine 40 that a virtual disk has been allocated and assigned to virtual machine 40. In general terms, virtual machine 40 is a software construct that acts as a physical computer system. For instance, virtual machine 40 can run applications, e.g., application 46, provide services, and process commands. Examples of application 46 can include software directed to accounting, spreadsheets, databases, word processing, media consumption, procurement and development, product development, and the like. A virtual machine can run its own operating system, e.g., operating system 42. Example operating systems include Microsoft Windows and Unix. When application 46 writes data, operating system 42 can direct the write to virtual disk 22. Operating system 42 can keep a map that identifies portions of virtual disk 22 that are used and portions that are available. In order to determine where data stored in virtual disk 22 is physically stored, operating system 42 can communicate with file system 60.

Operating system 50 can also notify virtual machine 40 of certain characteristics of virtual disk 22, such as an amount of available space. Virtual machine 40 need not be aware that virtual disk 22 is dynamic. When operating system 50 assigns virtual disk 22 to virtual machine 40, operating system 50 notifies virtual machine 40 how much space is available to virtual machine 40 in virtual disk 22. Virtual machine 40 sees virtual disk 22 as a storage object that is the size specified by operating system 50. Virtual machine 40 can be unaware that the actual size, or number of physical clusters used to store virtual disk 22 is initially quite small and can increase as virtual machine 40 writes additional data to virtual disk 22. For example, operating system 50 can allocate 100 Gb to virtual disk 22 and assign virtual disk 22 to virtual machine 40. Virtual machine 40 sees virtual disk 22 as a 100 Gb storage object. File system 60 sees virtual disk 22 as a zero Gb storage object. In an embodiment, virtual machine 40 maintains a map, such as a bitmap, that represents virtual disk 22 as a sequential arrangement of virtual clusters. Each virtual cluster can have a fixed size. For example, virtual machine 40 can view virtual disk 22, which in this example is a 100 GB virtual disk, as a sequence of 25K virtual clusters where each virtual cluster is 4 Kb. Virtual machine 40 can use this map to identify which virtual clusters are used and which are unused.

An example write by application 46 to virtual disk 22 can occur as follows. Application 46 executes a write operation. The write can involve saving data in a file that is in use by application 46, storing a file downloaded from a network, and the like. Virtual machine 40 detects whether virtual disk 22 has available space. Virtual machine 40 can, for example, check the map of virtual clusters to detect which virtual clusters, if any, are available. If virtual machine 40 detects that virtual disk 22 is full, or has no available virtual clusters, the write fails. Otherwise, application 46 passes information associated with the write, e.g., the file name to virtual machine 40. Application 46 can also pass the data to be written to virtual machine 40. Virtual machine 40 directs the write operation to virtual disk 22. To do so, virtual machine 40 passes information to file system 60 indicating that a write is desired. The information can identify the size or amount of data to be written, as well the file name of a file the data is associated with.

File system 60 detects whether there is sufficient space allocated to virtual disk 22 to accommodate the data. For example, if application 46 is writing 1 Gb of data, and file system 60 detects that 100 Gb is allocated to virtual disk 22 and only 50 Gb is used, file system 60 detects that there is enough allocated space in virtual disk 22 to accommodate the write. In such a case, file system 60 can notify virtual machine 40 that there is enough space available and that the write can proceed. Otherwise, file system 60 can indicate that the write should fail. Alternatively, file system 60 can allocate additional storage space for virtual disk 22 and allow the write to proceed.

If file system 60 detects that virtual disk 22 has enough allocated space to accommodate the write, file system 60 assigns one or more physical clusters or ranges of physical clusters in storage 20 that will actually store the data. File system 60 can also send information identifying the physical clusters to virtual machine 40. Virtual machine 40 transmits the data to file system 60 and updates the virtual cluster map to identify the virtual clusters that are assigned to the data as used. File system 60 can store the data in storage 20. Alternatively, virtual machine 22 can transmit the data directly to storage 20. Storage 20 stores the data at the physical clusters specified by file system 60.

When virtual machine 40 no longer needs a specific data item, for example, when application 46 issues a command to delete a file, virtual machine 40 can update the virtual cluster map to indicate that the virtual clusters that store the data no longer contain valid data. The data in the virtual clusters is designated as deleted and the virtual clusters are marked as available storage space.

Operations related to creation of virtual machines and management of virtual machines and resources for virtual machines can be performed by virtualization module 70, which includes resize manager 72. For example, when a virtual disk, e.g., virtual disk 22 is shrunk, resize manager 72 can communicate with a resize module, e.g., resize module 44, to shrink virtual disk 22.

In one example, operating system 50 can detect a condition that indicates that a virtual disk should be shrunk and pass this information to virtualization module 70. Resize manager 72 can then inform resize module 44 that a shrink of virtual disk 22 is being performed. Resize module 44 can then create a file in virtual disk 22 that occupies essentially all of the free space of virtual disk 22. Resize module 44 can use the map of virtual clusters maintained by virtual machine 40 to generate a list of virtual clusters in virtual disk 22 that the file occupies. This list is essentially a list of all virtual clusters in virtual disk 22 that are unused by virtual disk 22, whether the locations have never been written to or have been used previously by virtual machine 40 to store data and then designated as deleted by virtual machine 40.

Virtual machine 40 can pass the list of virtual clusters to operating system 50. In an embodiment, virtual machine 40 first translates the list of virtual clusters into a list of corresponding physical clusters. File system 60 provides virtual machine 40 with the physical clusters that store data for virtual disk 22 when virtual machine 40 writes to the physical clusters. This allows virtual machine 40 to map between physical clusters and virtual clusters. The physical clusters in the list represent locations that contain data that virtual machine 40 does not care about.

Operating system 50 can read data from all locations in virtual disk 22 that virtual machine 40 has written to except the locations identified in the list, and copy the read data to a new virtual disk, e.g., virtual disk 24. After this copy operation completes, virtual disk 24 contains only data that virtual machine 40 cares about and is only big enough to accommodate that data. That is, virtual disk 24 is likely to be smaller than virtual disk 22 since virtual disk 24 has storage space used only for data that is of interest to virtual machine 40, while virtual disk 22 likely included storage space that stored data that virtual machine 40 no longer cared about.

Figure 2A:
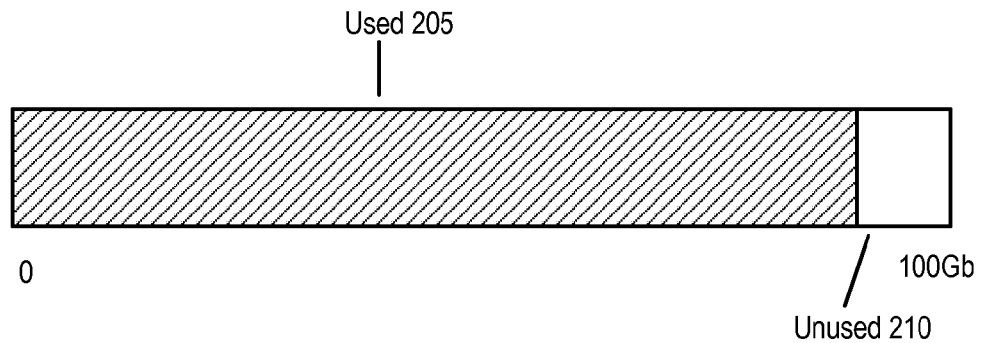
FIG. 2A is an illustration of a dynamic virtual disk, according to one embodiment.

FIG. 2A is an illustration of a 100 Gb virtual disk, such as virtual disk 22 of FIG. 1. FIG. 2A illustrates used space 205 and unused space 210 in the virtual disk from the perspective of a file system, such as file system 60 of FIG. 1. Used space 205 and unused space 210 represent one or more physical clusters. In an embodiment, the virtual disk is a dynamic virtual disk that has grown from essentially zero bytes of used storage space to nearly full. For example, an operating system, such as operating system 50 of FIG. 1, allocated 100 Gb to the virtual disk. The operating system can grant write permission to a virtual machine, such as virtual machine 40 of FIG. 1.

At the time the operating system creates the virtual disk and allocates storage space (e.g., 100 Gb) to the virtual disk, the file system sees the virtual disk as having essentially zero bytes used to store data. At this point, no physical clusters are assigned to store data for the virtual disk. When the virtual machine writes data to the virtual disk, the file system assigns specific physical clusters in an underlying storage device, such as storage 20 of FIG. 1 to the data and marks as used the physical clusters that contain the data written by the virtual machine. Over time, the virtual disk grows from its initial size, where nearly zero bytes of storage space are marked by the file system as used, to approximately 90 Gb of storage space being marked by the file system as used, as shown in FIG. 2A. As the virtual machine writes to the virtual disk, the file system marks additional storage space (e.g., physical clusters) used, and the virtual disk grows dynamically.

Figure 2B:
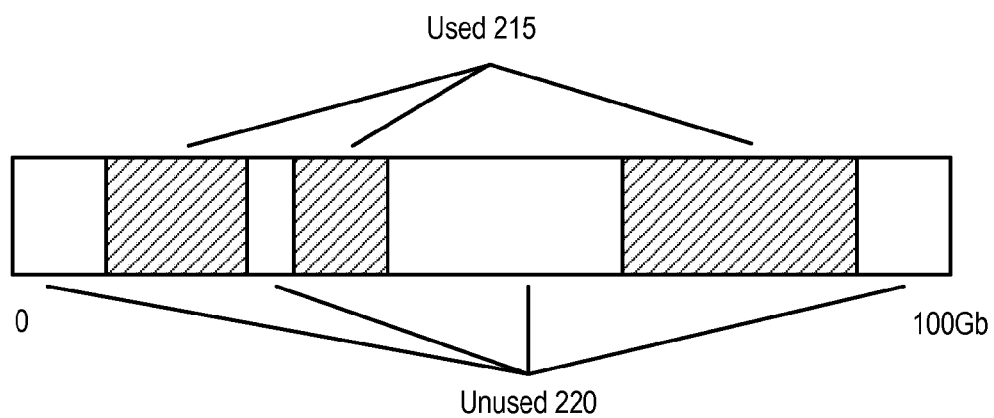
FIG. 2B is an illustration of a dynamic virtual disk, according to one embodiment.

FIG. 2B illustrates the virtual disk of FIG. 2A from the perspective of the virtual machine. FIG. 2B shows used space 215 and unused space 220. Used space 215 and unused space 220 represent one or more virtual clusters. The virtual machine that writes to the virtual disk can also delete data from the virtual disk. In an embodiment, the virtual machine's deletion operation(s) account for some or all of the unused space 220 in the virtual disk. However, the delete operations are not passed to the file system, so while the file system views the virtual disk as using ninety percent of the storage space allocated to the virtual disk, the virtual machine sees the virtual disk as using only about fifty percent of the storage space allocated to the virtual disk, as shown in FIG. 2B.

Figure 2C:
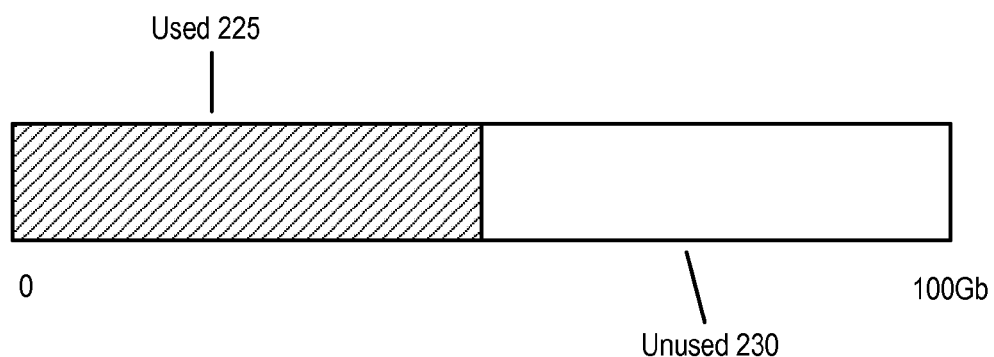
FIG. 2C is an illustration of a dynamic virtual disk, according to one embodiment.

FIG. 2C illustrates the virtual disk of FIG. 2A from the perspective of the file system after a shrink operation, as described below. FIG. 2C shows used space 225 and unused space 230. Used space 225 and unused space 230 represent one or more physical clusters. It is noted that while the used space 225 is depicted in FIG. 2C as being a series of contiguously located clusters, no such arrangement need exist in the underlying physical storage device. As shown in FIGS. 2A and 2B, the file system sees certain physical clusters included in the virtual disk as used by the virtual disk, even though the virtual machine views the corresponding virtual clusters as unused. A shrink operation causes the file system to view these regions as unused. After a shrink operation, the file system sees a virtual disk that is approximately 50 percent used, as opposed to before the shrink operation, where the file system perceived the virtual disk as ninety percent used. As can be seen, the shrink operation results in additional space being available for use by the file system.

Figure 3:
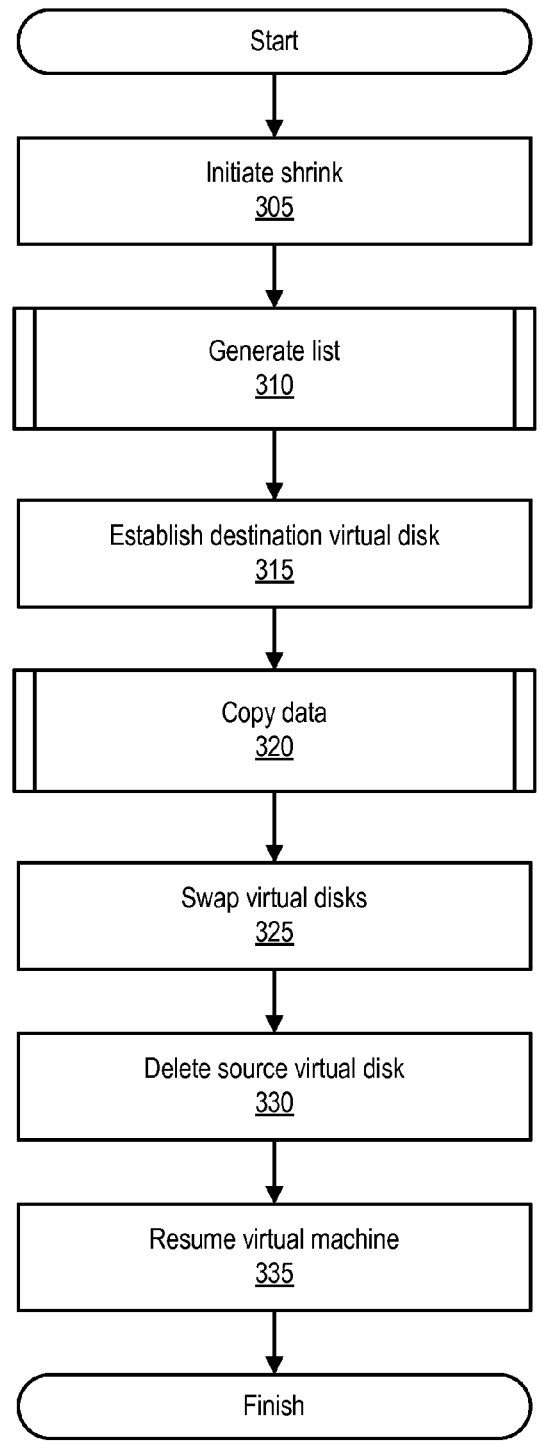
FIG. 3 is a flowchart of a method of performing a dynamic virtual disk shrink operation, according to one embodiment.

FIG. 3 is a flowchart of a method of performing a virtual disk shrink operation. In an embodiment, the method is performed by a system such as the system of FIG. 1. A shrink operation is initiated at 305. The shrink can be initiated in response to a user command. For example, a system administrator can manually select a virtual disk, such as virtual disk 22 of FIG. 1, and initiate a shrink operation of the virtual disk. The virtual disk being shrunk is known as a source virtual disk. Alternatively, the shrink operation can be automatically initiated in response to detection of a threshold condition. For example, an operating system, such as operating system 50 of FIG. 1, can detect that utilization of a virtual disk, or an underlying physical storage device, such as storage 20 of FIG. 1, has reached a certain threshold, e.g., ninety percent full. In response to detecting this threshold is attained, the operating system can initiate a shrink operation of the virtual disk. The operating system can detect attainment of the threshold through communications with a file system, such as file system 60 of FIG. 1, that manages the storage space, such as storage 20 of FIG. 1, that the virtual disk uses. The operating system can also initiate a shrink on a periodic basis, or in response to detecting an elapsed amount of time since a prior shrink operation.

In response to the operating system detecting that a shrink operation is to be performed, the operating system issues a command to a resize manager, such as resize manager 72 of FIG. 1, to begin the shrink. The resize manager then notifies a resize module, such as resize module 44, as shown in FIG. 1, in a virtual machine, such as virtual machine 40 of FIG. 1, of the shrink operation. The resize manager can perform operations related to the shrink operation on behalf of the host operating system. The resize module can perform operations related to the shrink on behalf of the virtual machine.

Figure 4A:
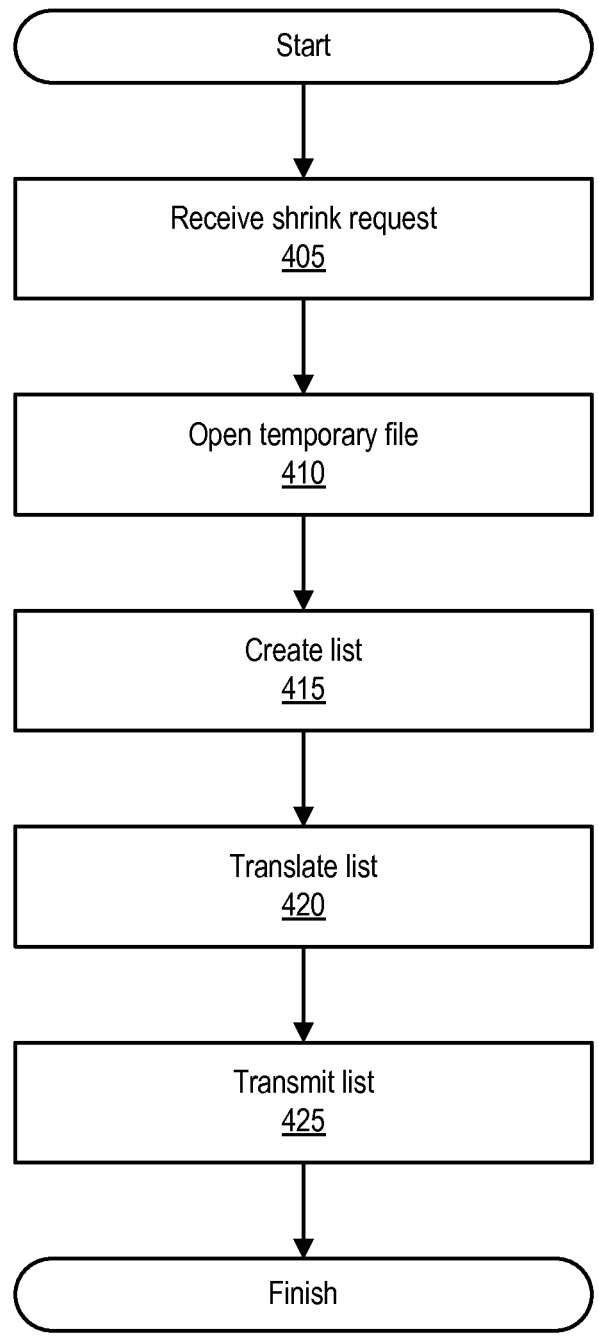
FIG. 4a is a flowchart showing additional aspects of a method of performing a dynamic virtual disk shrink operation, according to one embodiment.

At 310, as further described with reference to FIG. 4A, a list of clusters is generated. The list can be generated by the resize module in response to receiving notification of the shrink operation. The list identifies locations in the virtual disk that the virtual machine considers unused. Some of the locations identified in the list may be identified as used by the file system. The locations that are identified by the file system as used contribute to the amount of storage space utilized by the virtual disk, from the file system's perspective. The list identifies essentially all of the unused space the virtual machine sees in the virtual disk. In an alternative embodiment, the list can identify locations that the virtual machine considers used.

At 405, a resize module, such as resize module 44 of FIG. 1, receives notification that a virtual disk, such as virtual disk 22 of FIG. 1, is to be shrunk. In response to the notification, the resize module opens a temporary file at 410. The resize module sets the size of the file as approximately equal to the amount of free space in the virtual disk, as seen by a virtual machine, such as virtual machine 40 of FIG. 1. In an embodiment, the virtual machine will mark all virtual clusters identified as available space as unavailable and include the virtual clusters in the temporary file. The virtual machine typically leaves a relatively small number of virtual clusters free. This slack space can be used to store data if any operations cause the virtual disk to grow after shrinking.

Creating a file and causing the virtual clusters to be marked as used also causes the underlying physical clusters to be marked as used. This prevents any defragmentation operations that may be running on the underlying physical storage device, such as storage 20 of FIG. 1, from moving the locations. If the locations were moved during the shrink operation, the shrink operation could fail, or incorrect data could be copied.

The resize module sets an attribute of the file that specifies the file will be deleted when the file is closed. The resize module also sets an attribute of the file that specifies that a file system, such as file system 60 of FIG. 1, that manages storage of the file should not fill the unused space assigned for the file with zeros, or perform any writes operations to the locations assigned to the file. In an embodiment, the setting the attribute involves setting a flag in the file's metadata. The file system reads the value of the flag when the file system assigns space for the temporary file.

In an embodiment, the resize module creates multiple temporary files. For example, the resize module can create a temporary file for each contiguous range of virtual clusters. In another example, the virtual disk may span multiple partitions of an underlying physical storage device, such as storage 20 of FIG. 1. In this example, the resize module can create a temporary file for each partition the virtual disk spans. Alternatively, the virtual disk can be included in a single partition.

At 415, the resize module identifies the virtual clusters that are assigned to store data included in the file and creates a list of the virtual clusters. At 420, the resize module translates the virtual cluster identifiers into physical cluster identifiers and creates a new list of the physical cluster identifiers. In an embodiment, the virtual clusters and physical clusters are not the same size. In such a case, a single virtual cluster number can correspond to multiple physical cluster numbers, or vice-versa. After translating the list of virtual cluster numbers to a list of physical cluster numbers, the resize module transmits the list to the resize manager at 425.

Returning to FIG. 3, at 315 the operating system establishes a new virtual disk, such as virtual disk 24 of FIG. 1, at 315. This virtual disk will serve as a destination virtual disk for the data stored in the source virtual disk. The operating system can allocate the same amount of storage space for the destination virtual disk as was allocated to the source virtual disk, or the operating system can allocate a different amount of storage space for the destination virtual disk. The operating system can specify that the destination virtual disk is a dynamic virtual disk. Initially, the destination virtual disk is essentially empty, or has a size of zero bytes, as viewed from the file system.

Figure 4B:
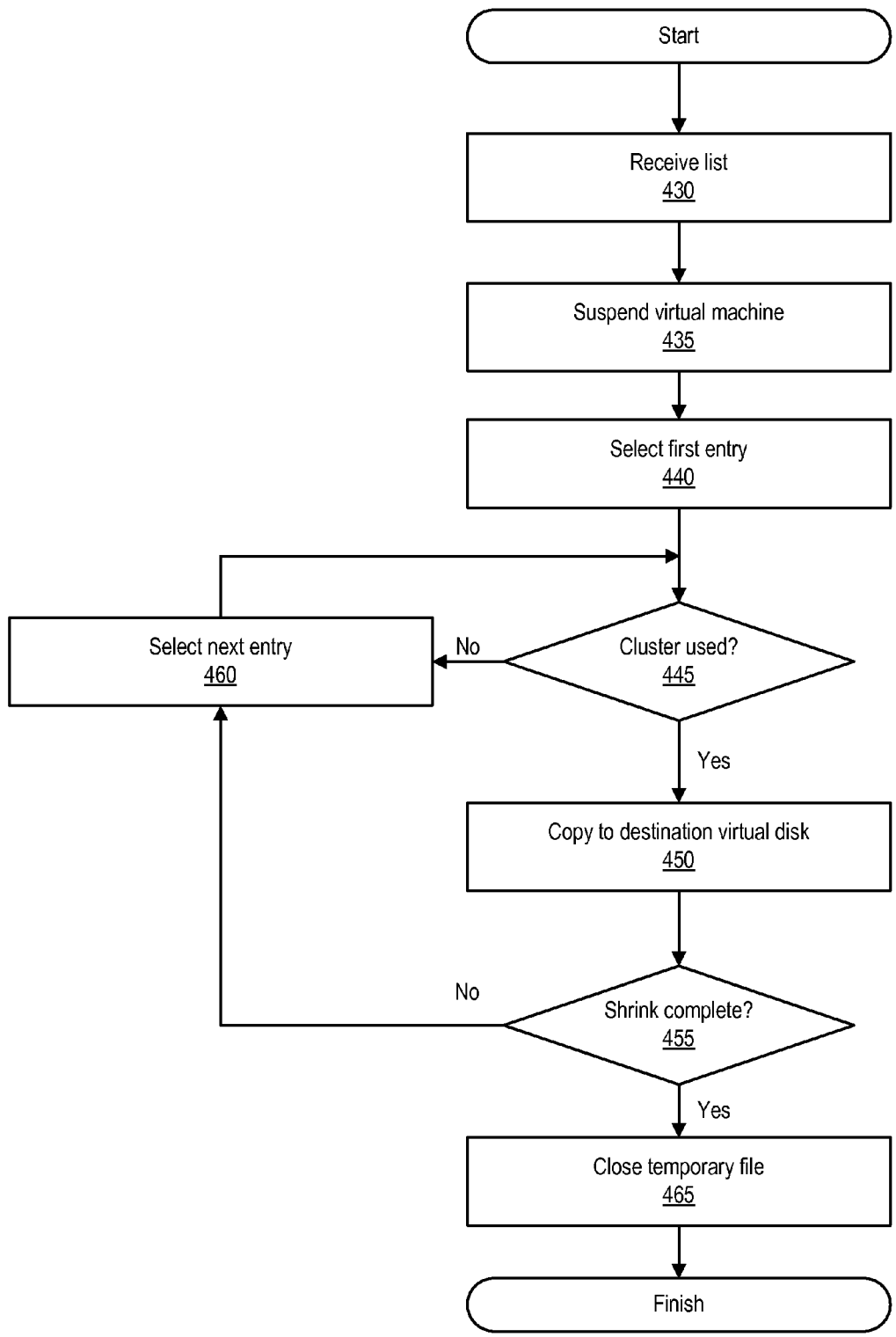
FIG. 4b is a flowchart showing additional aspects of a method of performing a dynamic virtual disk shrink operation, according to one embodiment.

At 320, as further described with reference to FIG. 4B, the operating system copies data from the source virtual disk to the destination virtual disk. At 430, the resize manager receives the list generated by the resize module. At 435, the operating system suspends the virtual machine. While the virtual machine is suspended, the virtual machine is unable to write to the virtual disk. The virtual machine can still process reads from the virtual disk while the virtual machine is suspended. In an embodiment, the operating system can shut down the virtual machine completely such that the virtual machine does not perform any operations while the shrink is ongoing.

The file system maintains a list of physical clusters of the underlying physical storage device that store data for the virtual disk. At 440, the operating system selects the first entry in the list of physical clusters, corresponding to the first physical cluster in the physical storage device. At 445, the operating system compares this physical cluster identifier with the entries in the list of unused physical clusters received from the resize module to determine whether the physical cluster identified by the file system as used is used by the virtual machine. The operating system does not copy data in the physical cluster from the source virtual disk to the destination virtual disk if the physical cluster is identified in both lists, as the list received from the resize module identifies physical clusters that the virtual machine is no longer using and the operating system does not copy clusters identified as unused by the virtual machine. If the physical cluster is identified as used by the file system and the virtual machine (e.g., the physical cluster is not identified in the list received from the resize module), the operating system copies the cluster from the source virtual disk to the destination virtual disk at 450. The operating system reads such clusters from the locations of the source virtual disk and writes to clusters assigned by the file system to the destination virtual disk. Each cluster written to the destination virtual disk causes the file system to dynamically increase the size of the destination virtual disk.

At 455, the operating system detects whether additional clusters remain to be copied from the source virtual disk to the destination virtual disk. In an embodiment, this involves traversing a list of all clusters identified by the file system as used by the source virtual disk. If so, the operating system selects the next entry in the list of physical clusters marked as used by the file system at 460.

Once all clusters that need to be copied to the destination virtual disk are copied to the destination virtual disk, the resize module closes the temporary file at 465, which causes the temporary file to be deleted.

Returning to FIG. 3, the operating system swaps virtual disks at 325. To do so, the operating system grants the virtual machine read and write access to the destination virtual disk and removes the virtual machine's permission to access the source virtual disk. The operating system can then, at 330, delete the source virtual disk.

Once the shrink operation is complete, the operating system resumes the virtual machine at 335. Once the virtual machine is resumed, the virtual machine can read from and write to the destination virtual disk.

Figure 5:
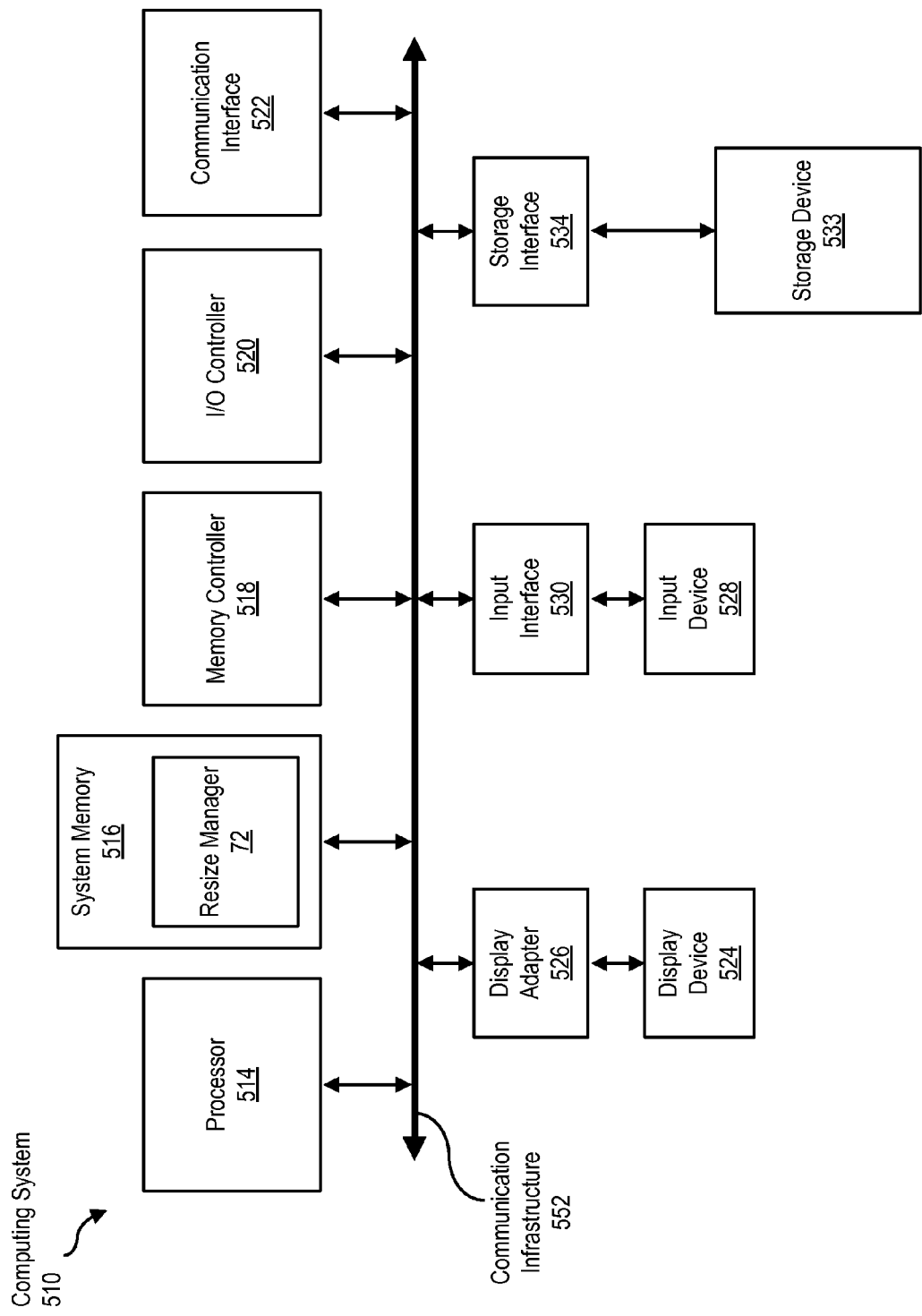
FIG. 5 is a block diagram of a computing device, illustrating how a resize manager can be implemented in software, according to one embodiment.

FIG. 5 is a block diagram of a computing device, illustrating how a resize manager 72 can be implemented in software. Computing system 510 broadly represents any single or multi-processor computing device or system capable of executing computer-readable instructions. Examples of computing system 510 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 510 may include at least one processor 514 and a system memory 516. By executing the software that implements a resize manager 72, computing system 510 becomes a special purpose computing device that is configured to participate in dynamic virtual disk shrink operations.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing all or some of the operations described herein. Processor 514 may also perform and/or be a means for performing any other operations, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. In one example, program instructions implementing a RAM module 135 may be loaded into system memory 516.

In certain embodiments, computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 550, and storage interface 554.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1594 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, computing system 510 may also include at least one input device 528 coupled to communication infrastructure 512 via an input interface 550. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a data storage device 533 coupled to communication infrastructure 512 via a storage interface 534. Storage device 533 generally represents any type or form of storage device or medium capable of storing data and/or other computer-readable instructions. For example, storage device 533 may include a magnetic disk drive (e.g., a so-called hard drive), a floppy disk drive, an optical disk drive, a flash drive, or the like. Storage interface 534 generally represents any type or form of interface or device for transferring data between storage device 533 and other components of computing system 510.

In certain embodiments, storage device 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 533 may also include other similar structures or devices for allowing computer software, data, or other computer-readable instructions to be loaded into computing system 510. For example, storage device 533 may be configured to read and write software, data, or other computer-readable information. Storage device 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5.

Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 510 may be configured as an application specific integrated circuit (ASIC) adapted to implement one or more of the embodiments disclosed herein.

Figure 6:
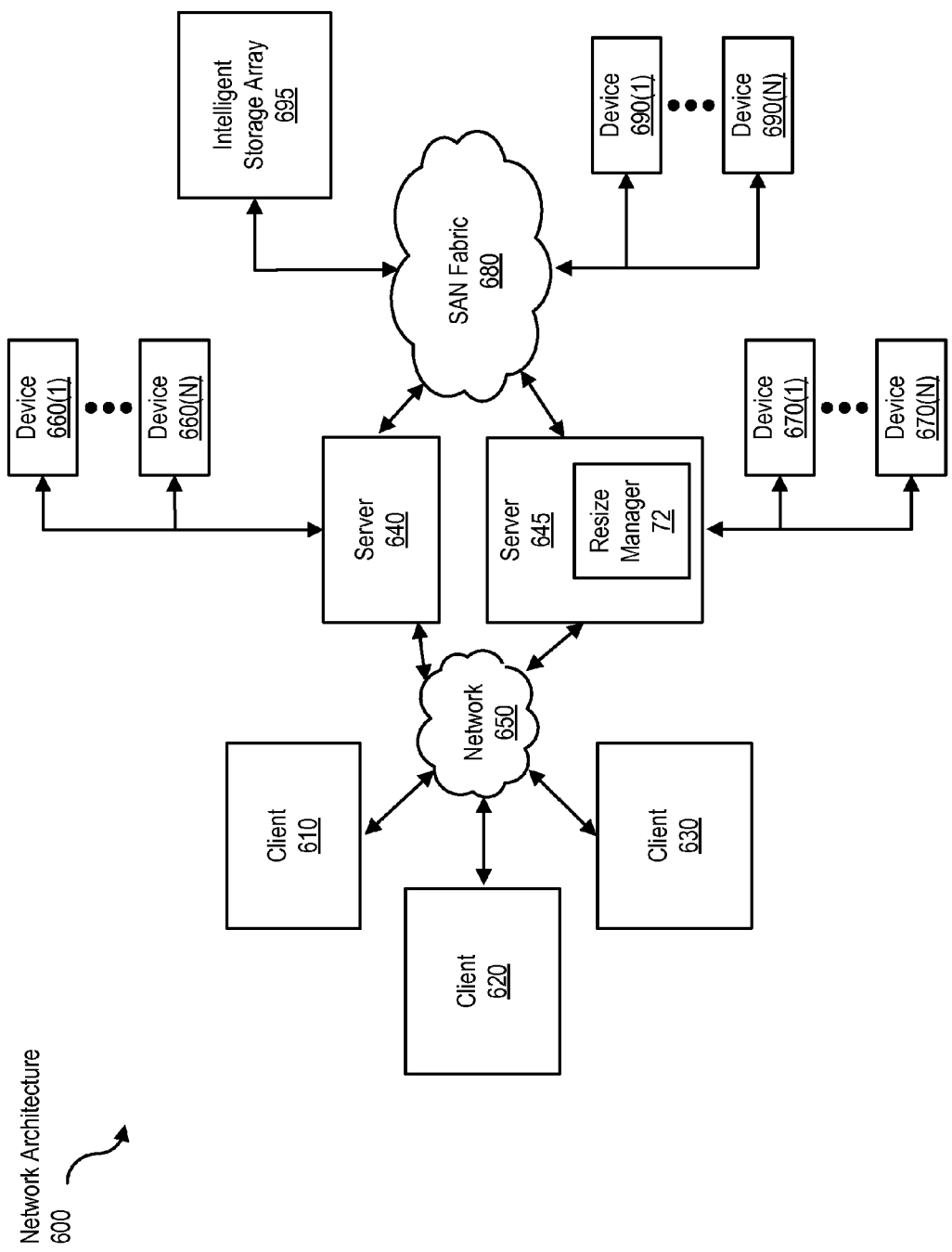
FIG. 6 is a block diagram of a networked system, illustrating how various computing devices can communicate via a network, according to one embodiment.

FIG. 6 is a block diagram of a network architecture 600 in which client systems 610, 620, and 630 and servers 640 and 645 may be coupled to a network 650. Client systems 610, 620, and 630 generally represent any type or form of computing device or system.

Similarly, servers 640 and 645 generally represent computing devices or systems, such as application servers or database servers implemented on a computing device such as computing system 510 in FIG. 5, configured to provide various database services and/or run certain software applications. Network 650 generally represents any telecommunication or computer network including, for example, an intranet, a wide area network (WAN), a local area network (LAN), a personal area network (PAN), or the Internet. In one example, servers 640 and/or 645 may include a RAM module 135 as shown in FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS).

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 510 of FIG. 5, a communication interface, such as communication interface 522 in FIG. 5, may be used to provide connectivity between each client systems 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of the computing devices in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, an archive module in FIG. 1 may transform behavior of a computing device in order to cause the computing device to store and manage data operations in a RAM.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving a request to perform a shrink operation on a first storage object, wherein the first storage object comprises a plurality of storage locations assigned to a virtual machine;
    in response to the request,
        creating a file, wherein
            the file comprises a first set of storage locations that are unused by the virtual machine, and
            the first set of storage locations comprises multiple non-contiguous portions of the first storage object;
        generating information that identifies the first set of storage locations, wherein the first set of storage locations is a first subset of the plurality of storage locations, and
            the generating comprises accessing a map, wherein
                the map indicates which storage locations of the plurality of storage locations are included in the file, and which storage locations of the plurality of storage locations are not included in the file; and
    transmitting the information to a host, wherein
        the host is configured to perform the shrink operation, and
        the shrink operation comprises
            creating a second storage object,
            reading data from a second set of storage locations, wherein
                the second set of storage locations is a second subset of the plurality of storage locations, and
                the first set of storage locations and second set of storage locations are mutually exclusive, and
            copying the data to the second storage object.

2. The method of claim 1, wherein
the first storage object and second storage object comprise dynamic virtual disks.

3. The method of claim 1, wherein
the file is created by the virtual machine in response to the request.

4. The method of claim 3, further comprising:
detecting completion of the shrink operation; and
deleting the file in response to the detecting.

5. The method of claim 1, wherein
the first set of storage locations corresponds to unused portions of the first storage object.

6. The method of claim 1, further comprising:
generating a second list, wherein
    the first list corresponds to unused portions of a first partition of the first storage object,
    the second list corresponds to unused portions of a second partition of the first storage object, and
    the host is configured to merge the second list with the first list.

7. The method of claim 1, further comprising:
setting an attribute of the file, wherein the attribute indicates that creating the file does not require any input/output (I/O) operations; and
marking the first set of storage locations as unavailable.

8. The method of claim 1, wherein
the host is further configured to allocate an amount of storage space for the second storage object in response to receiving the request, wherein
    the amount of storage space equals a first amount of storage space allocated to the first storage object.

9. A non-transitory computer readable storage medium storing program instructions executable to:
    receive a request to perform a shrink operation on a first storage object, wherein the first storage object comprises a plurality of storage locations assigned to a virtual machine;
    in response to the request,
        create a file, wherein
            the file comprises a first set of storage locations that are unused by the virtual machine, and
            the first set of storage locations comprises multiple non-contiguous portions of the first storage object;
        generate information that identifies the first set of storage locations, wherein the first set of storage locations is a first subset of the plurality of storage locations, and
            generating the information comprises accessing a map, wherein
                the map indicates which storage locations of the plurality of storage locations are included in the file, and which storage locations of the plurality of storage locations are not included in the file; and
    transmit the information to a host, wherein
        the host is configured to perform the shrink operation, and
        the shrink operation comprises
            creating a second storage object,
            reading data from a second set of storage locations, wherein
                the second set of storage locations is a second subset of the plurality of storage locations, and
                the first set of storage locations and second set of storage locations are mutually exclusive, and
            copying the data to the second storage object.

10. The non-transitory computer readable storage medium of claim 9, wherein
the first storage object and second storage object comprise dynamic virtual disks.

11. The non-transitory computer readable storage medium of claim 9, wherein
the file is created by the virtual machine in response to the request.

12. The non-transitory computer readable storage medium of claim 11, wherein the program instructions are further executable to:
detect completion of the shrink operation; and
delete the file in response to the detecting.

13. The non-transitory computer readable storage medium of claim 9, wherein
the first set of storage locations corresponds to unused portions of the first storage object.

14. The non-transitory computer readable storage medium of claim 9, wherein the program instructions are further executable to:
generate a second list, wherein the first list corresponds to unused portions of a first partition of the first storage object, the second list corresponds to unused portions of a second partition of the first storage object, and the host is configured to merge the second list with the first list.

15. The non-transitory computer readable storage medium of claim 9, wherein the program instructions are further executable to:

set an attribute of the file, wherein the attribute indicates that creating the file does not require any input/output (I/O) operations; and mark the first set of storage locations as unavailable.

16. The non-transitory computer readable storage medium of claim 9, wherein the program instructions are further executable to:

the host is further configured to allocate an amount of storage space for the second storage object in response to receiving the request, wherein the amount of storage space equals a first amount of storage space allocated to the first storage object.

17. A system comprising:

one or more processors; and receive a request to perform a shrink operation on a first storage object, wherein the first storage object comprises a plurality of storage locations assigned to a virtual machine;

in response to the request create a file, wherein the file comprises a first set of storage locations that are unused by the virtual machine, and the first set of storage locations comprises multiple non-contiguous portions of the first storage object;

generate information that identifies the first set of storage locations, wherein the first set of storage locations is a first subset of the plurality of storage locations, and the generating comprises accessing a map, wherein the map indicates which storage locations of the plurality of storage locations are included in the file, and which storage locations of the plurality of storage locations are not included in the file; and transmit the information to a host, wherein the host is configured to perform the shrink operation, and the shrink operation comprises creating a second storage object, reading data from a second set of storage locations, wherein the second set of storage locations is a second subset of the plurality of storage locations, and the first set of storage locations and second set of storage locations are mutually exclusive, and copying the data to a second storage object.

18. The system of claim 17, wherein the file is created by the virtual machine in response to the request, and the program instructions are further executable to detect completion of the shrink operation, and delete the file in response to the detecting.

19. The system of claim 17, wherein the first set of storage locations corresponds to unused portions of the first storage object.

20. The system of claim 17, wherein the program instructions are further executable to:

generate a second list, wherein the first list corresponds to unused portions of a first partition of the first storage object, the second list corresponds to unused portions of a second partition of the first storage object, and the host is configured to merge the second list with the first list.

21. The method of claim 1, wherein the information comprises a list of addresses of virtual storage location, and the method further comprises translating the addresses of the virtual storage locations into corresponding addresses of physical storage locations of the first storage object.

22. The method of claim 1, wherein the second storage object is defragmented relative to the first storage object by virtue of the copying.

* * * * *